United States Patent [19]

Inatome

[11] 4,341,363
[45] Jul. 27, 1982

[54] TAPE TENSION CONTROL CIRCUIT

[75] Inventor: Kiyoshi Inatome, Kanagawa, Japan

[73] Assignee: Sony Corporation, Tokyo, Japan

[21] Appl. No.: 183,852

[22] Filed: Sep. 3, 1980

[30] Foreign Application Priority Data

Sep. 4, 1979 [JP] Japan .................................. 54/113345

[51] Int. Cl.³ ...................... B65H 59/38; B65H 63/02
[52] U.S. Cl. ....................................... 242/189; 318/7; 360/73
[58] Field of Search ................ 242/186, 189, 190, 191, 242/206, 208; 360/71, 73, 84–88; 318/7, 480

[56] References Cited

U.S. PATENT DOCUMENTS

| | | | |
|---|---|---|---|
| 3,912,990 | 10/1975 | Kuhnlein et al. | 318/7 |
| 3,969,766 | 7/1976 | Tanaka et al. | 360/85 |
| 4,015,177 | 3/1977 | VazMartins | 318/7 |
| 4,104,685 | 8/1978 | Chang | 360/84 |

Primary Examiner—Leonard D. Christian
Attorney, Agent, or Firm—Hill, Van Santen, Steadman, Chiara & Simpson

[57] ABSTRACT

A tape tension control circuit for a helical scan video tape recorder is disclosed having a pair of tension sensors. A sensor output from a take-up (supply) side sensor is fed back to a take-up (supply) reel motor when a pinch roller and a capstan are driving a tape. When the pinch roller and the capstan are deactuated, the sensor output from the take-up (supply) side sensor is then fed back to a supply (take-up) reel motor.

9 Claims, 3 Drawing Figures

TAPE TENSION CONTROL CIRCUIT

BACKGROUND OF THE INVENTION

The present invention relates generally to a helical scan VTR (video tape recorder), and is directed more particularly to a tape tension control circuit used in a helical scan VTR.

Recently, a helical scan VTR has been employed not only in home use but also in broadcast use. As the helical scan VTR is used in the broadcast field, it becomes necessary that a magnetic tape is transported smoothly in the forward and reverse directions while it is wrapped on a tape guide drum. In the conventional helical scan VTR, the tape tension in the forward running direction is controlled in such a manner that a band brake engaged with a supply reel disc is controlled by a tension sensing arm which touches a magnetic tape extended between a supply reel and the tape guide drum. The tape tension in the reverse direction is controlled such that a tension sensor is provided between the tape guide drum and the take-up reel to control a take-up reel motor. It is, however, impossible to precisely control by the tension sensing arm and the band brake the tape tension in various modes. In addition, the difference between the tape tension control systems at the tape take-up and supply sides results in difficult adjustments and causes problems in manufacturing VTRs and in other situations.

SUMMARY OF THE INVENTION

Accordingly, an object of the present invention is to provide a tape tension control circuit for use with a helical scan VTR.

Another object of the invention is to provide a tension control circuit suitable for use in a helical scan VTR which has a pair of tension sensors between a tape guide drum and each of a supply reel and a take-up reel.

In a helical scan VTR to which the present invention is applied, a reel motor is provided for each of the reels to drive the same.

In the present invention, in accordance with the operation modes of the VTR, the output from a sensor at a supply reel side is fed back to a supply reel motor or to a take-up reel motor. Similarly, the output from the take-up reel side sensor is fed back to either supply reel motor or take-up reel motor in accordance with the operation mode of the VTR.

According to the present invention, there is provided a tension servo control circuit for a helical scan video tape recorder having a tape guide drum on which a magnetic tape is helically wrapped, which comprises:

(a) supply and take-up reels;

(b) a pair of reel drive motors coupled to said supply and take-up reels for driving these reels in response to selected operation modes;

(c) a first sensor for sensing tensions of said magnetic tape extended between said take-up reel and said tape guide drum;

(d) a second sensor for sensing tensions of said magnetic tape extended between said supply reel and said tape guide drum;

(e) a first feedback loop for supplying the sensed tension at said first sensor to either one of said reel drive motors in response to said selected operation modes; and (f) a second feedback loop for supplying the sensed tension at said second sensor to either one of said reel drive motors in response to said selected operation modes.

Other objects, features and advantages of the present invention will become apparent from the following description taken in conjunction with the accompanying drawings in which the like references designate the same elements and parts.

DESCRIPTION OF THE PREFERRED EMBODIMENTS

The present invention will be described with reference to the attached drawings.

Figure 1:
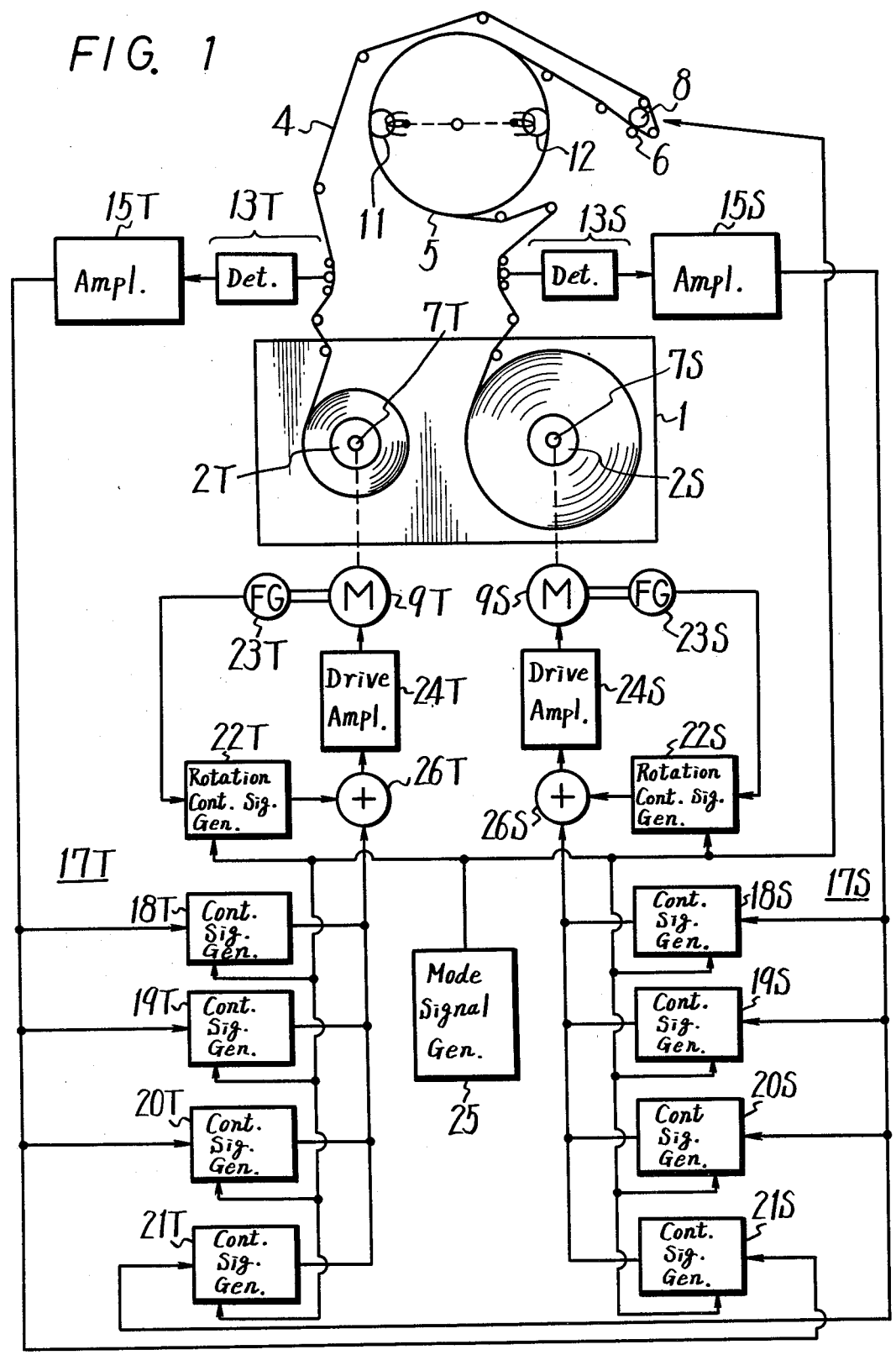
FIG. 1 is a block diagram showing an example of the tape tension control circuit according to the present invention used with a helical scan VTR.

FIG. 1 shows one embodiment of a helical scan video tape recorder (VTR) employing an example of the tape tension control circuit of the present invention, wherein a reference numeral 1 designates a tape cassette in which a take-up reel 2T and a supply reel 2S are contained.

Normally, a magnetic video tape 4 rewound from the supply reel 2S runs through a tape guide drum 5, a capstan 6, and a pinch roller 8, and is wound up on the take-up reel 2T. Both take-up reel 2T and supply reel 2S are respectively engaged with the VTR by way of take-up and supply shafts 7T and 7S which are directly driven by take-up and supply side reel motors 9T and 9S, respectively. The tape guide drum 5 includes a pair of rotary magnetic heads 11 and 12. The magnetic tape 4 is wrapped on the outer periphery of the tape guide drum 5 over an angular range of about 180° and transported. A video signal is recorded on the magnetic tape 4 by the rotary magnetic heads 11 and 12 to form a slant magnetic track with respect to the length-wise direction of the magnetic tape 4. In general, the running speed of the magnetic tape 4 is determined by the capstan 6 and pinch roller 8. Tape take-up side and tape supply side tape tension detectors or sensors 13T and 13S are respectively provided between the tape take-up reel 2T and the tape guide drum 5, and between the tape supply reel 2S and the guide drum 5. Each of the tape tension detectors 13T and 13S is made of a tension arm and a converting means for converting the depth of movement of the tension arm to a corresponding electrical signal. Amplifiers 15T and 15S are respectively connected to the tape tension detectors 13T and 13S so as to amplify the tape tension detector outputs therefrom.

Servo circuits 17T and 17S are provided at tape take-up and supply sides, respectively. The tape take-up side servo circuit 17T is constructed of a take-up side tension control signal generating circuit 18T for the forward direction constant speed running mode, a take-up side tension control signal generating circuit 19T for the reverse direction constant speed running mode, a take-up side tension control signal generating circuit 20T for the tape running stop mode, a tension control signal generating circuit 21T for the fast rewind running mode, a take-up side rotation control signal generating circuit 22T, a take-up side rotation detector 23T, and a motor driving amplifier 24T. The supply side servo circuit 17S is constructed of a supply side tension control signal generating circuit 18S for the forward direction constant speed running mode, a supply side tension control signal generating circuit 19S for the reverse direction constant speed running mode, a supply side tension control signal generating circuit 20S for the tape running stop mode, a tension control signal generating circuit 21S for the fast forward running mode, a supply side rotation control signal generating circuit 22S, a supply side rotation detector 23S, and a motor driving amplifier 24S.

Not only in the above forward direction constant speed running mode and reverse direction constant speed running mode, but also in the fast forward running mode and fast rewind running mode the magnetic tape 4 is transported on the tape guide drum 5. Further, the above respective control signal generating circuits are selectively controlled by the mode control signal delivered from a mode signal generator 25.

In FIG. 1, 26T and 26S respectively designate adders each of which adds the speed control signal and tension control signal with each other.

In the forward and reverse direction constant speed running modes in which the capstan 6 and pinch roller 8 are in operation, the torques of the take-up and supply side reel motors 9T and 9S are simultaneously controlled so as to make the tension of the magnetic tape 4 constant. In the fast forward running mode, the take-up side reel motor 9T is controlled to be rotated at a constant rotation speed, and at the same time the torque of the supply side reel motor 9S is controlled by the output from the tape tension detector 13T to make the tape tension of the magnetic tape 4 constant. At the fast rewind running mode, the supply side reel motor 9S is controlled to be rotated at a constant speed and the take-up side reel motor 9T is controlled in its torque by the output from the tape tension detector 13S so as to make the tension of the magnetic tape 4 constant. At the above fast forward running and fast rewind running modes, the pinch roller 8 is spaced from the capstan 6.

The output from the take-up side tape tension detector 13T is supplied through the amplifier 15T to each of the control signal generating circuits 18T, 19T, 20T and 21S, while the output from the supply side tape tension detector 13S is supplied through the amplifier 15S to each of the control signal generating circuits 18S, 19S, 20S and 21T, respectively.

The outputs from the control signal generating circuits 18T, 19T, 20T and 21T are fed through the amplifier 24T to the take-up side reel motor 9T, and the outputs from the control signal generating circuits 18S, 19S, 20S and 21S are fed through the amplifier 24S to the supply side reel motor 9S, respectively.

The rotation speed of the take-up side reel motor 9T is detected by the take-up side rotation detector 23T and the detected output therefrom is fed to the take-up side rotation control signal generating circuit 22T whose output is fed through the amplifier 24T to the take-up side reel motor 9T. The rotation speed of the supply side reel motor 9S is detected by the supply side rotation detector 23S and the detected output therefrom is fed to the supply side rotation control signal generating circuit 22S whose output is fed through the amplifier 24S to the motor 9S.

Although the respective tension control signal generating circuits control the torques of the reel motors so as to set the tension of the magnetic tape 4 at a given value, the control amount thereof is different depending upon the tape running modes. Therefore, circuits whose circuit constants or reference voltages are different are provided for the respective tape running modes.

In the example of the invention shown in FIG. 1, the take-up and supply side rotation control signal generating circuits 22T and 22S are well known in the art.

A practical circuit for the above tension control signal generating circuits will be now described with reference to FIG. 2. In the figure, 30 designates a phase compensation circuit to which the tape tension detected signal is applied through an input terminal 31 and a change-over switch SW1. The phase compensation circuit 30 is constructed of resistors 32, 33 and a capacitor 34 of a large capacity, and serves as a kind of low pass filter whose time constant is suitably determined in accordance with the respective control signal generating circuits shown in FIG. 1. A level comparator 35 is provided which will compare the output from the phase compensation circuit 30 with the reference voltage from a reference voltage source 40 for setting the tape tension. The compared output from the level comparator 35 is delivered through a change-over switch SW2 to an output terminal 50. The level comparator 35 consists of an operational amplifier 36 and negative feedback resistors 37, 38. The output from the phase compensation circuit 30 is supplied through the resistor 37 to the inverting input terminal of the operational amplifier 36. The resistor 38 is connected between the output terminal of the operational amplifier 36 and its inverting input terminal.

The tape tension setting reference voltage source 40 is formed of a potentiometer 41 connected between positive and negative DC voltage sources +B and −B and a series connection of resistors 42 and 43 for voltage-dividing the output voltage appearing at the movable portion of the potentiometer 41. The output appearing at the connection point between the resistors 42 and 43 is fed to the non-inverting input terminal of the operational amplifier 36.

Figure 2:
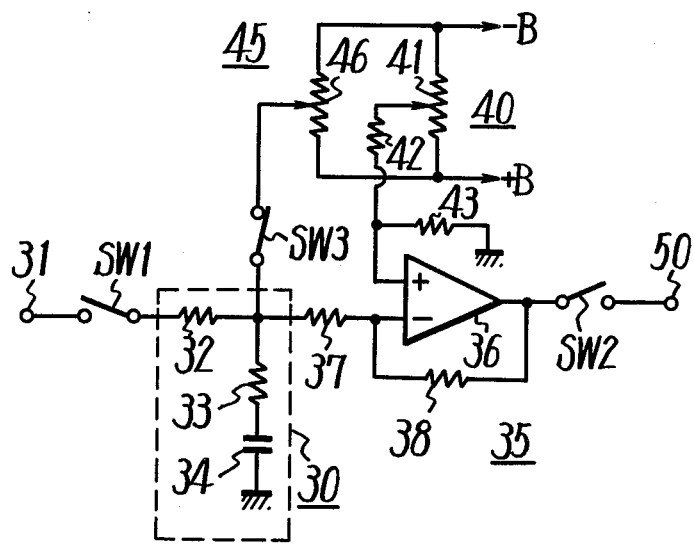
FIG. 2 is a circuit diagram showing a practical example of a part of the circuit shown in FIG. 1.

In FIG. 2, 45 designates an initial value voltage generating source for the phase compensation circuit 30. This initial value voltage generating source 45 consists of a potentiometer 46 connected between the positive and negative DC voltage sources +B and −B, and the output from the movable piece of the potentiometer 46 is applied through a change-over switch SW3 to the output terminal of the phase compensation circuit 30.

In the circuit of FIG. 2, the change-over switches SW1, SW2 and SW3 are changed over in ganged relation. When the detecting circuit is in the operating state, the switches SW1 and SW2 both become ON and the switch SW3 becomes OFF, while when the detecting circuit is in the non-operating state, the switches SW1 and SW2 are both in the OFF-state and the switch SW3 is in the ON-state.

When the detecting circuit operates normally, the phase compensation circuit 30 normally phase-compensates for the tape tension detected output and supplies its output to the level comparator 35. On the contrary, when the detecting circuit is in the non-operating state, the voltage from the initial value voltage generating source 45 is supplied through the switch SW3 and the resistor 33 to the capacitor 34 of the phase compensation circuit 30. Thus, the voltage at the output terminal of the phase compensation circuit 30 is set at a voltage which is determined by the initial value voltage of the initial value voltage generating circuit 45.

Accordingly, even at a first instant when the detecting circuit operates and the switches SW1 and SW2 become ON simultaneously, a predetermined voltage can be obtained from the level comparator 35. If the initial value voltage generating source 45 is not provided, after a time period has elapsed in which the switch SW1 becomes ON and then the capacitor 34 is charged up by the tape tension detected output, the normal tension control signal is first delivered to the output terminal 50. Thus, the tape tension control by the reel motor is disturbed so that the tape tension becomes too large or a looseness appears in the tape.

The manner for determining the above initial value voltage is as follows. The initial value voltage is set so that the torque of the take-up side reel motor is slightly large relative to the normal operating condition, while the torque of the supply side reel motor is slightly small relative to the normal operating mode.

Figure 3:
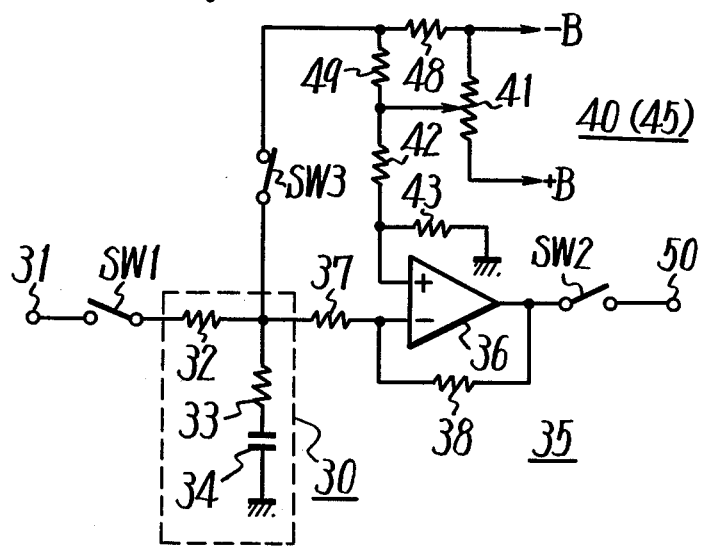
FIG. 3 is a circuit diagram showing another example of the circuit portion shown in FIG. 2.

Turning to FIG. 3, another example of the tension error detecting circuit will be described. In FIG. 3, the parts and elements corresponding to those of FIG. 2 are marked with the same reference numerals and their detailed description will be omitted. In the example of FIG. 3, the tape tension setting reference voltage source 40 and the initial value voltage generating source 45 provided separately in the example of FIG. 2 are made integral.

In the example of FIG. 3, the tape tension setting reference voltage source 40 is the same as that of FIG. 2 in construction, but a series connection of resistors 48 and 49 is connected between the negative DC voltage source −B of the potentiometer 41 and the movable part of the potentiometer 41 forming the tape tension setting reference voltage source 40. The connection point of the resistors 48 and 49 is connected through the change-over switch SW3 to the output terminal of the phase compensation circuit 30. In this case, the resistance value of the resistor 48 at the side of the negative DC voltage source −B is selected about 100 KΩ and that of the other resistor 49 is selected about 1 KΩ, by way of example.

With the example of the invention shown in FIG. 3, by adjusting only the potentiometer 41, the tape tension setting reference voltage and the initial value voltage can be simultaneously adjusted. In this case, the tape tension setting reference voltage and the initial value voltage are set different from each other.

The mode signal generator 25 in FIG. 1 generates a plurality of command signals in association with a function controller (not shown) having function buttoms manually operable. These command signals are supplied to respective circuits including a plunger drive circuit for the pinch roller 8. In this meaning, although a single solid line is depicted in FIG. 1, at least 11 command signal lines are to be derived from the mode signal generator 25.

I claim as my invention:

1. A tension servo control circuit responsive to selected operation modes for a helical scan video tape recorder having a tape guide drum on which a magnetic tape is helically wrapped, comprising:
   (a) supply and take-up reels;
   (b) a pair of reel drive motors coupled to said supply and take-up reels driving the reels in response to the selected operation modes;
   (c) a first sensor means for sensing tensions of said magnetic tape extended between said take-up reel and said tape guide drum;
   (d) a second sensor means for sensing tensions of said magnetic tape extended between said supply reel and said tape guide drum;
   (e) a first feedback loop means for supplying a first control signal related to the sensed tension at said first sensor to either one of said reel drive motors in response to said selected operation modes;
   (f) a second feed back loop means for supplying a second control signal related to the sensed tension at said second sensor to either one of said reel drive motors in response to said selected operation modes;
   (g) said first and second feedback loop means including a plurality of control signal generators, each control signal generator corresponding to a different operating mode of the recorder corresponding to different tape tensions;
   (h) a mode signal generator means for selecting appropriate control signal generators in response to manually entered recorder mode commands;
   (i) a rotation control sensing means for measuring a rotation speed of the supply and take-up reels and generating a speed control signal; and
   (j) adder means for combining tension control signals from the control signal generators and the speed control signals from the rotation control sensing means, and for providing a combined output signal for control of the drive motors.

2. A tension servo control circuit of claim 1 wherein each of said reel drive motors has a rotation sensor, and means connected to the rotation sensor for controlling a rotational speed of a respective reel drive motor based on an output of said rotation sensor and depending on the selected operation mode.

3. A tension servo control circuit of claim 1 further comprising drive means for driving the tape extended between said tape guide drum and said first sensor, said drive means including a capstan and a pinch roller whose driving speed is dependent upon said selected operation modes.

4. A tension servo control circuit of claim 3 wherein when said tape is driven in the fast forward direction without said drive means being engaged, fast forward means are provided for feeding back sensed tension at said first sensor to said reel drive motor for the supply reel, and when said tape is driven in the fast reverse direction without said drive means being engaged, fast rewind means are provided for feeding back sensed tension at said second sensor to the reel drive motor for the take-up reel.

5. A tension servo control circuit of claim 3 wherein when said tape is driven by said drive means, means are provided for feeding back said sensed tension at said first sensor to said take-up reel motor, and means are provided for feeding back said sensed tension at said second sensor to said supply reel motor, respectively, despite running directions of the tape.

6. A tension servo control circuit responsive to selected operation modes for a helical scan video tape recorder having a tape guide drum on which a magnetic tape is helically wrapped, comprising:
   (a) supply and take-up reels;
   (b) a pair of reel drive motors coupled to said supply and take-up reels driving the reels in response to the selected operation modes;
   (c) a first sensor means for sensing tensions of said magnetic tape extended between said take-up reel and said tape guide drum;

(d) a second sensor means for sensing tensions of said magnetic tape extended between said supply reel and said tape guide drum;

(e) a first feedback loop means for supplying a first control signal related to the sensed tension at said first sensor to either one of said reel drive motors in response to said selected operation modes;

(f) a second feedback loop means for supplying a second control signal related to the sensed tension at said second sensor to either one of said reel drive motors in response to said selected operation modes;

(g) drive means for driving the tape extended between said tape guide-drum and said first sensor, said drive means including a capstan and a pinch roller whose driving speed is dependent upon said selected operation modes;

(h) when said tape is driving in the fast forward direction without said drive means being engaged, fast forward means being provided for feeding back sensed tension at said first sensor to said reel drive motor for the supply reel;

(i) when said tape is driven in the fast reverse direction without said drive means being engaged, fast rewind means being provided for feeding back sensed tension at said second sensor to the reel drive motor for the take-up reel; and (j) each of said reel drive motors having a rotation sensor, and means connected to the rotation sensor for controlling a rotational speed of a respective reel drive motor based on an output of said rotation sensor and depending on the selected operation mode.

7. A tension servo control circuit responsive to selected operation modes for a helical scan video tape recorder having a tape guide drum on which a magnetic tape is helically wrapped, comprising:

(a) supply and take-up reels;

(b) a pair of reel drive motors coupled to said supply and take-up reels driving the reels in response to the selected operation modes;

(c) a first sensor means for sensing tensions of said magnetic tape extended between said take-up reel and said tape guide drum;

(d) a second sensor means for sensing tensions of said magnetic tape extended between said supply reel and said tape guide drum;

(e) a first feedback loop means for supplying a first control signal related to the sensed tension at said first sensor to either one of said reel drive motors in response to said selected operation modes;

(f) a second feedback loop means for supplying a second control signal related to the sensed tension at said second sensor to either one of said reel drive motors in response to said selected operation modes;

(g) each of said reel drive motors having rotation sensor, and means connected to the rotation sensor for controlling a rotational speed of a respective reel drive motor based on an output of said rotation sensor and depending on the selected operation mode; and (h) a mixer means being provided, and for each drive motor a rotation control signal generator connecting to said mixer means, said mixer means mixing a rotation speed signal from the rotation generator with a tension signal from tension control signal generator means and feeding the output to the respective drive motor.

8. A tension servo control circuit responsive to selected operation modes for helical scan video tape recorder having a tape guide drum on which a magnetic tape is helically wrapped, comprising:

(a) supply and take-up reels;

(b) a reel drive motor connected to each of the supply and take-up reels;

(c) a first sensor means for sensing tensions of said magnetic tape extended between said take-up reel and said tape guide drum;

(d) a second sensor means for sensing tensions of said magnetic tape extended between said supply reel and said tape guide drum;

(e) tension control signal generator means connected between the first sensor means and take-up side drive motor for varying a torque of said drive motor in dependence upon selected operation modes of the tension servo control circuit;

(f) a further tension control signal generator means connected between the second sensor means and supply side drive motor for varying a torque thereon in response to selected operation modes of the servo control circuit;

(g) a fast forward control signal generator means connected between the first sensor and the supply side drive motor responsive to a fast forward selected operation mode;

(h) a fast rewind tension control signal generator means connected between the second sensor means and the take-up side drive motor responsive to a first rewind selected operation mode; and (i) mode signal generator means for creating said selected operation modes.

9. A tension servo control circuit responsive to selected operation modes for a helical scan video tape recorder having a tape guide drum on which a magnetic tape is helically wrapped, comprising:

(a) supply and take-up reels;

(b) a pair of reel drive motors coupled to said supply and take-up reels driving the reels in response to the selected operation modes;

(c) a first sensor means for sensing tensions of said magnetic tape extended between said take-up reel and said tape guide drum;

(d) a second sensor means for sensing tensions of said magnetic tape extended between said supply reel and said tape guide drum;

(e) a first feedback loop means for supplying a first control signal related to the sensed tension at said first sensor to at least one of said reel drive motors in response to said selected operation modes;

(f) a second feedback loop means for supplying a second control signal related to the sensed tension at said second sensor to at least one of said reel drive motors in response to said selected operation modes;

(g) said first and second feedback loop means including a plurality of separate control signal generators, each control signal generator corresponding to a different operating mode of the recorder corresponding to different tape tensions; and (h) means for selecting appropriate control signal generators in response to manually entered recorder mode commands.

* * * * *